April 5, 1949. J. A. CROWLEY, JR 2,466,005
CRACKING WITH A CONTACT MASS
Filed Dec. 17, 1946 2 Sheets-Sheet 1

INVENTOR
JOHN A. CROWLEY, JR.
BY
Oswald F. Hayes
ATTORNEY

April 5, 1949.    J. A. CROWLEY, JR    2,466,005
CRACKING WITH A CONTACT MASS
Filed Dec. 17, 1946    2 Sheets-Sheet 2

INVENTOR.
JOHN A. CROWLEY, Jr.
BY
*Oswald G. Hayes*
ATTORNEY

Patented Apr. 5, 1949

2,466,005

UNITED STATES PATENT OFFICE 2,466,005

CRACKING WITH A CONTACT MASS

John A. Crowley, Jr., New York, N. Y., assignor to Socony-Vacuum Oil Company, Incorporated, a corporation of New York Application December 17, 1946, Serial No. 716,763

15 Claims. (Cl. 196—55)

This invention relates to apparatus and process for the cracking of hydrocarbons in the presence of a granular solid heat transfer agent which may, if desired, have catalytic properties. More particularly the invention relates to a method and means for conducting such operations under closely controlled conditions of time and temperature.

The invention is exemplified by processes for cracking hydrocarbons at relatively high cracking temperatures for very short periods of time to give selective conversion to low boiling olefins such as ethylene. Gas oil is readily converted to high yields of ethylene by cracking at temperatures in the neighborhood of 1500° F. for such reaction periods as 0.2 second. Conventional cracking equipment is not well adapted to such reactions since the usual tubular heaters cannot very well be operated to raise the temperature of the charge very rapidly without excessive coking which reduces the heat transfer rates. The rapid heating to high temperature required by this reaction can be efficiently conducted by passing the charge through a highly heated bed of granular solid heat transfer material. Continuous operation is obtained by inducing continuous movement of the bed and supplying fresh highly heated granules to the upper surface of the bed.

Promptly following reaction at the desired temperature for the desired time, the reaction mixture should be collectively quenched to a temperature at which further reaction will not occur in order to inhibit undesirable reactions such as polymerization to aromatic compounds.

According to the present invention the desired rapid heating and prompt quenching are accomplished by providing two continuously moving beds of granular solid heat transfer agent, one above the other. The lower bed is supplied at its upper surface with highly heated granules when the cold granules are supplied to the upper bed. The charge is admitted to the bottom of the lower hot bed and passes countercurrent in series through the lower and upper beds. Means are provided to separately supply and separately withdraw granules from the two beds. Preferably provision is made for a plenum chamber between the two beds from which the highly heated reaction mixture is continuously distributed into the lower part of the upper or cold bed.

These and other objects and advantages of the invention will be apparent from specific embodiments thereto shown in the annexed drawings, wherein.

Figure 1:
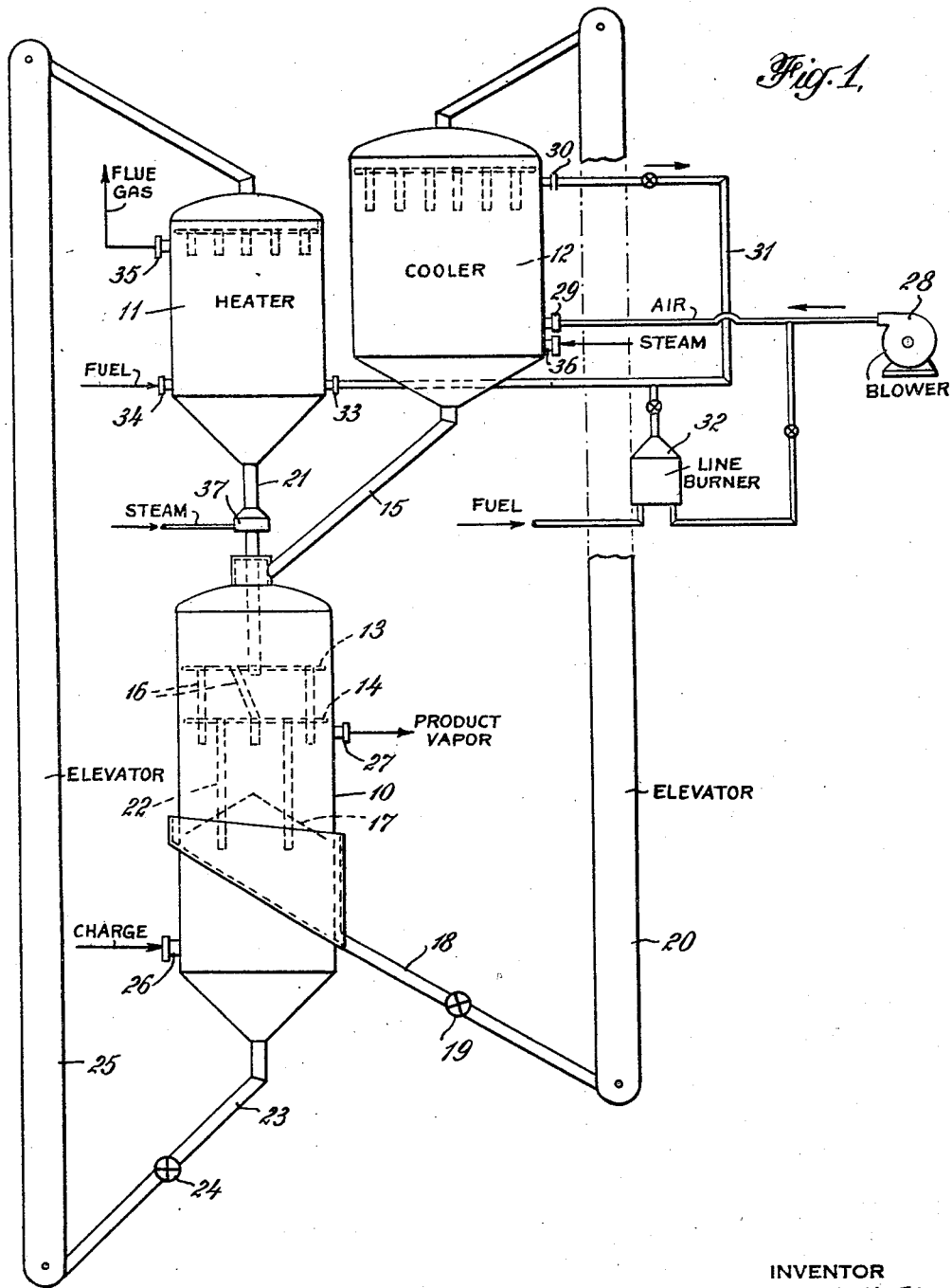
Figure 1 is a somewhat diagrammatic elevation of apparatus for conducting the process.
Figure 3:
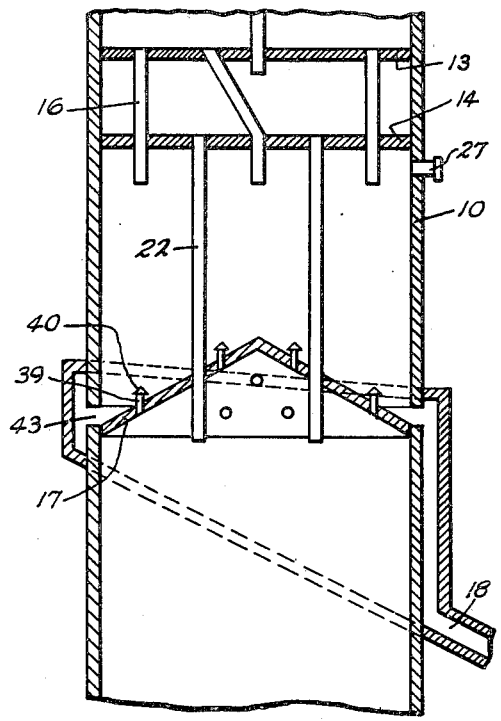
Figure 3 is an elevation in section of the reactor structure shown diagrammatically in Figure 1.

Referring specifically to Figure 1 and the detail section of Figure 3: reaction is conducted in a contacting chamber 10 to which hot and cold granules are separately supplied from a heater 11 and a cooler 12 respectively. Within the contacting chamber 10 and adjacent the upper end thereof are two plates 13 and 14 which serve to define two supply hoppers, an upper hopper between the top of the contactor 10 and plate 13 and a lower hopper between the plates 13 and 14. Cold granular solids from cooler 12 are transferred by line 15 to the upper hopper from which they are conducted by a number of feed legs 16 to the top of an upper bed in the contacting zone of contactor 10. The upper bed moves downwardly to a conical baffle 17 which diverts the solids to a circumferential discharge port 43 from which the solids are conducted by pipe 18 fitted with valve 19 to elevator 20. Elevator 20 conveys the solids again to cooler 12 wherein they are chilled and again returned to contactor 10.

Hot solids from heater 11 are fed by feed line 21 to the lower hopper from which they pass by feed legs 22 to a bed below conical baffle 17. Solids from the lower moving bed are discharged by pipe 23 fitted with valve 24 by a second elevator 25 which again conducts them to heater 11 in a manner similar to the cycle described in the cold granules. A suitable charge such as gas oil is admitted at 26 and distributed across the bottom of the lower bed in contactor 10. The charge passes upwardly in vapor state through the lower bed and is heated thereby to conversion temperature. It then passes out of the lower bed into a plenum chamber between the conical baffle 17 and the lower ends of pipes 22. The hot gases are passed through any suitable distributing means associated with the baffle 17 to the upper bed. Suitable means for this purpose are shown in Figure 3 as chimneys 39, each fitted with a deflecting cap 40. The hot reaction products pass upwardly through the upper cold bed above conical baffle 17, are disengaged at the bed from its upper surface and are then discharged at port 27 and conducted to separation and purification equipment of conventional type.

A separate circulation system for cold and hot solids renders the system extremely flexible. By circulating large amounts of cold solids relative to the amount of hot solids it is possible to achieve extremely rapid quenching of a very low temperature in the upper bed. Thus the quench may be conducted in such manner as to provide exhaust gases at 400 or 500° F. and thus cause substantially all the high boiling component of the reaction mixture to be deposited on the cold solid whereby it may be removed by combustion in the cooler. For such purposes tremendous excesses of air are circulated through the cooler in order to remove the heat of combustion of deposits as well as the heat acquired by the granular solids in the quench portion of the contactor 10. Preferably, air used to cool solids in the cooler 12 is employed as preheated air for combustion of fuel in heater 11 to heat solids for the heating bed in contactor 10. As shown in Figure 1, air is supplied by blower 28 to the lower part of cooler 12 by way of an inlet 29. Preheated air is discharged at 30 and transferred by line 31 to the heater 11. If this does not afford sufficient preheat for the heater 11, additional heat may be supplied by a line burner 32.

Preheated air and fuel are supplied to the heater 11 by inlets 33 and 34 respectively and combustion of the fuel is caused to take place within a moving bed of solids in heater 11. Products of combustion are then discharged by outlet 35 to waste heat boilers or the like.

In general, it is desirable to prevent gases from either heater 11 or cooler 12 from entering contactor 10. This is readily accomplished by purging the granular solids during or prior to transfer with an inert gas medium such as steam. The purge medium may be admitted to the bottom of the bed as indicated at 36 or it may be introduced to a transfer line as by the steam sealing zone 37. In either event, the purge medium is supplied at a sufficiently high temperature when it passes upwardly through the granular solids and at least a portion is discharged through the discharge line 30 or 35.

Figure 2:
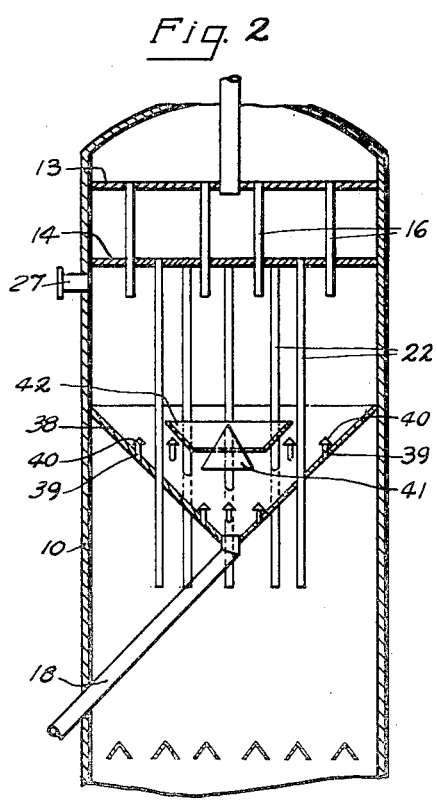
Figure 2 is an elevation in section of a preferred type of contacting chamber.

The embodiment shown in Figure 2 is generally similar to that of Figure 1 except that a different type of baffle is shown to divert and collect granular solids from the upper quench bed. In this case the baffle is in the shape of a funnel or inverted cone 38. A number of chimneys 39, each fitted with a deflecting cap 40, are fitted through the baffle 38 at suitable points to distribute hot reaction mixture through the lower part of the quench bed. Each of the several beds employed in the system, namely those in the heater 11, cooler 12 and upper and lower moving beds of contactor 10, is handled in such a manner as to induce a substantially uniform rate of flow throughout the width of the bed. One suitable arrangement for this purpose is shown in connection with the funnel-shaped baffle 38 which includes a central cone 41 surrounded by a hollow section of an inverted cone 42. The cone 42 may advantageously be supported by tack welding of the pipes 22 and the central cone 41 may be separated from meter 42 in any manner, not shown. The flow control zone in Figure 2 is particularly advantageous for use in connection with the funnel-shaped baffle 38 since this solid flow control means not only induces uniform flow of the solids but also aids in obtaining uniform distribution of the vaporous reaction mixture through the quench bed.

I claim:

1. A process for thermal cracking of hydrocarbons at high temperature and controlled reaction time which comprises passing a first granular solid heat transfer material at relatively low temperature as a substantially compact moving bed downwardly through the upper portion of a vertical contacting zone, diverting said first material to a discharge port at an intermediate level in said contacting zone, discharging the diverted material from said contacting zone, introducing to said contacting zone below said intermediate level a second granular solid heat transfer material at a relatively high temperature, passing said second material downwardly as a substantially compact moving bed through the lower portion of said contacting zone, passing vapor of said hydrocarbon upwardly through said bed of said second material to an open zone free of granules thereabove, passing vapors directly from said open zone into the lower portion of said bed of first material and upwardly therethrough, disengaging vapors from the upper surface of said first bed, discharging disengaged vapors from said contacting zone and controlling the rate of flow of said two beds independently to thereby control conditions of the cracking reaction.

2. A process for thermal cracking of hydrocarbons at high temperature and controlled reaction time which comprises passing a first granular solid heat transfer material at relatively low temperature as a substantially compact moving bed downwardly through the upper portion of a vertical contacting zone, diverting said first material to a centrally located discharge port at an intermediate level in said contacting zone, discharging the diverted material from said contacting zone, introducing to said contacting zone below said intermediate level a second granular solid heat transfer material at a relatively high temperature, passing second material downwardly as a substantially compact moving bed through the lower portion of said contacting zone, passing vapor of said hydrocarbon upwardly through said bed of said second material to an open zone free of granules thereabove, passing vapors directly from said open zone into the lower portion of said bed of first material and upwardly therethrough, disengaging vapors from the upper surface of said first bed, discharging disengaged vapors from said contacting zone and controlling the rate of flow of said two beds independently to thereby control conditions of the cracking reaction.

3. A process for thermal cracking of hydrocarbons at high temperature and controlled reaction time which comprises passing a first granular solid heat transfer material at relatively low temperature as a substantially compact moving bed downwardly through the upper portion of a vertical contacting zone, diverting said first material to a peripheral discharge port at an intermediate level in said contacting zone, discharging the diverted material from said contacting zone, introducing to said contacting zone below said intermediate level a second granular solid heat transfer material at a relatively high temperature, passing said second material downwardly as a substantially compact moving bed through the lower portion of said contacting zone, passing vapor of said hydrocarbon upwardly through said bed of said second material to an open zone free of granules thereabove, passing vapors directly from said open zone into the lower portion of said bed of first material and upwardly therethrough, disengaging vapors from the upper surface of said first bed, discharging disengaged vapors from said contacting zone and controlling the rate of flow of said two beds independently to thereby control conditions of the cracking reaction.

4. A process for thermal cracking of hydrocarbons at high temperature and controlled reaction time which comprises passing a first granular solid heat transfer material at relatively low temperature as a substantially compact moving bed downwardly through the upper portion of a vertical contacting zone, diverting said first material to a discharge port at an intermediate level in said contacting zone, discharging the diverted material from said contacting zone, introducing to said contacting zone below said intermediate level a second granular solid heat transfer material at a relatively high temperature, passing said second material downwardly as a substantially compact moving bed through the lower portion of said contacting zone, passing vapor of said hydrocarbon upwardly through said bed of said second material to an open zone free of granules thereabove, passing vapors directly from said open zone into the lower portion of said bed of first material and upwardly therethrough, disengaging vapors from the upper surface of said first bed, discharging disengaged vapors from said contacting zone, controlling the rate of flow of said two beds to thereby control conditions of the cracking reaction, transferring said first material to a cooling zone, passing a cooling gas in direct contact with said first material in said cooling zone, transferring said cooled first material to said upper portion of said contacting zone, transferring said second material from the bottom of said contacting zone to a heating zone, passing a heating gas in direct contact with said second material in said heating zone, and transferring said heated second material to said lower portion of said contacting zone.

5. A process for thermal cracking of hydrocarbons at high temperature and controlled reaction time which comprises passing a first granular solid heat transfer material at relatively low temperature as a substantially compact moving bed downwardly through the upper portion of a vertical contacting zone, diverting said first material to a discharge port at an intermediate level in said contacting zone, discharging the diverted material from said contacting zone, introducing to said contacting zone below said intermediate level a second granular solid heat transfer material at a relatively high temperature, passing said second material downwardly as a substantially compact moving bed through the lower portion of said contacting zone, passing vapor of said hydrocarbon upwardly through said bed of said second material to an open zone free of granules thereabove, passing vapors directly from said open zone into the lower portion of said bed of first material and upwardly therethrough, disengaging vapors from the upper surface of said first bed, discharging disengaged vapors from said contacting zone, controlling the rate of flow of said two beds to thereby control conditions of the cracking reaction, transferring said first material to a cooling zone, passing air in direct contact with said first material in said cooling zone to cool said first material and heat said air, transferring said cooled first material to said upper portion of said contacting zone, transferring said second material from the bottom of said contacting zone to a heating zone, mixing gaseous fuel with air heated by contact with said first material in said cooling zone as aforesaid, passing the resultant mixture of air and fuel under combustion conditions in direct contact with said second material in said heating zone, and transferring said heated second material to said lower portion of said contacting zone.

6. A contactor comprising a vertical shell, two vertically spaced horizontal plates extending across the upper portion of said shell to define an upper storage compartment above the upper plate and a lower storage compartment between the two plates, a funnel-shaped baffle extending across said shell below said plates defining an upper contacting chamber thereabove and a lower contacting chamber therebelow, a discharge tube extending from the bottom of said baffle in a generally downward direction to a point exterior of said shell, discharge means to withdraw granular solids from the bottom of said shell, a plurality of tubes extending downwardly from said upper compartment to a level in said shell intermediate said lower plate and said baffle, a plurality of tubes extending downwardly from said lower compartment to a level intermediate said baffle and said discharge means, inlet means to admit fluid to the lower portion of said lower chamber, a plurality of gas passage tubes extending through said baffle, a deflector associated with each of said gas passage tubes adapted to prevent entry of granular solids to the upper end thereof, gas outlet means in the upper part of said upper chamber, means to control flow of granular solids through said discharge tube and means to control flow of granular solids through said discharge means.

7. A contactor comprising a vertical shell, means in the upper portion of said shell defining an upper storage compartment and a lower storage compartment, a downwardly-converging, generally conical baffle extending across said shell below said compartments defining an upper contacting chamber thereabove and a lower contacting chamber therebelow, a discharge tube extending from the bottom of said baffle in a generally downward direction to a point exterior of said shell, a discharge means to withdraw granular solids from the bottom of said shell, means to transfer granular solid material downwardly from said upper compartment to a level in said shell intermediate said compartments and said baffle, means to transfer granular solid material downwardly from said lower compartment to a level intermediate said baffle and said discharge means, inlet means to admit fluid to the lower portion of said lower chamber, means defining a plurality of gas passages through said partition adapted to prevent entry of granular solids to the upper ends thereof, gas outlet means in the upper part of said upper chamber, means to control flow of granular solids through said discharge tube and means to control flow of granular solids through said discharge means.

8. A contactor comprising a vertical shell, two vertically spaced horizontal plates extending across the upper portion of said shell to define an upper storage compartment above the upper plate and a lower storage compartment between the two plates, baffle means to collect and divert granular solid material to a discharge port extending across said shell below said plates defining an upper contacting chamber thereabove and a lower contacting chamber therebelow, a discharge tube extending from said discharge port in a generally downward direction to a point exterior of said shell, discharge means to withdraw granular solids from the bottom of said shell, a plurality of tubes extending downwardly from said upper compartment to a level in said shell intermediate said lower plate and said baffle means, a plurality of tubes extending downwardly from said lower compartment to a level intermediate said baffle means and said discharge means, inlet means to admit fluid to the lower portion of said lower chamber, a plurality of gas passage tubes extending through said baffle means, a deflector associated with each of said gas passage tubes adapted to prevent entry of granular solids to the upper end thereof, gas outlet means in the upper part of said upper chamber, means to control flow of granular solids through said discharge tube and means to control flow of granular solids through said discharge means.

9. A contactor comprising a vertical shell, two vertically spaced horizontal plates extending across the upper portion of said shell to define an upper storage compartment above the upper plate and a lower storage compartment between the two plates, baffle means to collect and divert granular solid material to a discharge port extending across said shell below said plates defining an upper contacting chamber thereabove and a lower contacting chamber therebelow, a discharge tube extending from said discharge port in a generally downward direction to a point exterior of said shell, discharge means to withdraw granular solids from the bottom of said shell, a plurality of tubes extending downwardly from said upper compartment to a level in said shell intermediate said lower plate and said baffle means, a plurality of tubes extending downwardly from said lower compartment to a level intermediate said baffle means and said discharge means, inlet means to admit fluid to the lower portion of said lower chamber, gas transfer means associated with said baffle means adapted to permit upward flow of vapor from said lower chamber to said upper chamber and to prevent entry of granular solids to said lower chamber from said upper chamber, gas outlet means in the upper part of said upper chamber, means to control flow of granular solids through said discharge tube and means to control flow of granular solids through said discharge means.

10. A contactor comprising a vertical shell, means in the upper portion of said shell defining an upper storage compartment and a lower storage compartment, baffle means to collect and divert granular solid material to a discharge port extending across said shell below said compartments defining an upper contacting chamber thereabove and a lower contacting chamber therebelow, a discharge tube extending from said discharge port in a generally downward direction to a point exterior of said shell, discharge means to withdraw granular solids from the bottom of said shell, means to transfer granular solid material downwardly from said upper compartment to a level in said shell intermediate said compartments and said baffle means, means to transfer granular solid material downwardly from said lower compartment to a level intermediate said baffle means and said discharge means, inlet means to admit fluid to the lower portion of said lower chamber, gas transfer means associated with said baffle means adapted to permit upward flow of vapor from said lower chamber to said upper chamber and to prevent entry of granular solids to said lower chamber from said upper chamber, gas outlet means in the upper part of said upper chamber, means to control flow of granular solids through said discharge tube and means to control flow of granular solids through said discharge means.

11. A contactor comprising a vertical shell, two vertically spaced horizontal plates extending across the upper portion of said shell to define an upper storage compartment above the upper plate and a lower storage compartment between the two plates, a funnel-shaped baffle extending across said shell below said plates defining an upper contacting chamber thereabove and a lower contacting chamber therebelow, a discharge tube extending from the bottom of said baffle in a generally downward direction to a point exterior of said shell, discharge means to withdraw granular solids from the bottom of said shell, a plurality of tubes extending downwardly from said upper compartment to a level in said shell intermediate said lower plate and said baffle, a plurality of tubes extending downwardly from said lower compartment to a level intermediate said baffle and said discharge means, inlet means to admit fluid to the lower portion of said lower chamber, a plurality of gas passage tubes extending through said baffle, a deflector associated with each of said gas passage tubes adapted to prevent entry of granular solids to the upper end thereof, gas outlet means in the upper part of said upper chamber, means to control flow of granular solids through said discharge tube and means to control flow of granular solids through said discharge means, a cooler, means to transfer granular solids from said discharge tube to said cooler, means to pass air through a moving bed of granular solids in said cooler, means to transfer cooled granular solids from said cooler to said upper compartment, a heater, means to transfer granular solids from said discharge means to said heater, means to pass air from said cooler to said heater, means to mix fuel with air so passed to said heater, discharge means adapted to withdraw products of combustion from said heater, and means to transfer heated granular solids from said heater to said lower compartment.

12. A contactor comprising a vertical shell, means in the upper portion of said shell defining an upper storage compartment and a lower storage compartment, a funnel-shaped baffle extending across said shell below said compartments defining an upper contacting chamber thereabove and a lower contacting chamber therebelow, a discharge tube extending from the bottom of said baffle in a generally downward direction to a point exterior of said shell, discharge means to withdraw granular solids from the bottom of said shell, means to transfer granular solid material downwardly from said upper compartment to a level in said shell intermediate said compartments and said baffle, means to transfer granular solid material downwardly from said lower compartment to a level intermediate said baffle and said discharge means, inlet means to admit fluid to the lower portion of said lower chamber, a plurality of gas passage tubes extending through said baffle, a deflector associated with each of said gas passage tubes adapted to prevent entry of granular solids to the upper end thereof, gas outlet means in the upper part of said upper chamber, means to control flow of granular solids through said discharge tube and means to control flow of granular solids through said discharge means, a cooler means to transfer granular solids from said discharge tube to said cooler, means to pass air through a moving bed of granular solids in said cooler, means to transfer cooled granular solids from said cooler to said upper compartment, a heater, means to transfer granular solids from said discharge means to said heater, means to pass air from said cooler to said heater, means to mix fuel with air so passed to said heater, discharge means adapted to withdraw products of combustion from said heater, and means to transfer heated granular solids from said heater to said lower compartment.

13. A contactor comprising a vertical shell, two vertically spaced horizontal plates extending across the upper portion of said shell to define an upper storage compartment above the upper plate and a lower storage compartment between the two plates, baffle means to collect and divert granular solid material to a discharge port extending across said shell below said plates defining an upper contacting chamber thereabove and a lower contacting chamber therebelow, a discharge tube extending from said discharge port in a generally downward direction to a point exterior of said shell, discharge means to withdraw granular solids from the bottom of said shell, a plurality of tubes extending downwardly from said upper compartment to a level in said shell intermediate said lower plate and said baffle means, a plurality of tubes extending downwardly from said lower compartment to a level intermediate said baffle means and said discharge means, inlet means to admit fluid to the lower portion of said lower chamber, a plurality of gas passage tubes extending through said baffle means, a deflector associated with each of said gas passage tubes adapted to prevent entry of granular solids to the upper end thereof, gas outlet means in the upper part of said upper chamber, means to control flow of granular solids through said discharge tube and means to control flow of granular solids through said discharge means, a cooler, means to transfer granular solids from said discharge tube to said cooler, means to pass air through a moving bed of granular solids in said cooler, means to transfer cooled granular solids from said cooler to said upper compartment, a heater, means to transfer granular solids from said discharge means to said heater, means to pass air from said cooler to said heater, means to mix fuel with air so passed to said heater, discharge means adapted to withdraw products of combustion from said heater, and means to transfer heated granular solids from said heater to said lower compartment.

14. A contactor comprising a vertical shell, two vertically spaced horizontal plates extending across the upper portion of said shell to define an upper storage compartment above the upper plate and a lower storage compartment between the two plates, baffle means to collect and divert granular solid material to a discharge port extending across said shell below said plates defining an upper contacting chamber thereabove and a lower contacting chamber therebelow, a discharge tube extending from said discharge port in a generally downward direction to a point exterior of said shell, discharge means to withdraw granular solids from the bottom of said shell, a plurality of tubes extending downwardly from said upper compartment to a level in said shell intermediate said lower plate and said baffle means, a plurality of tubes extending downwardly from said lower compartment to a level intermediate said baffle means and said discharge means, inlet means to admit fluid to the lower portion of said lower chamber, gas transfer means associated with said baffle means adapted to permit upward flow of vapor from said lower chamber to said upper chamber and to prevent entry of granular solids to said lower chamber from said upper chamber, gas outlet means in the upper part of said upper chamber, means to control flow of granular solids through said discharge tube and means to control flow of granular solids through said discharge means, a cooler, means to transfer granular solids from said discharge tube to said cooler, means to pass air through a moving bed of granular solids in said cooler, means to transfer cooled granular solids from said cooler to said upper compartment, a heater, means to transfer granular solids from said discharge means to said heater, means to pass air from said cooler to said heater, means to mix fuel with air so passed to said heater, discharge means adapted to withdraw products of combustion from said heater, and means to transfer heated granular solids from said heater to said lower compartment.

15. A contactor comprising a vertical shell, means in the upper portion of said shell defining an upper storage compartment and a lower storage compartment, baffle means to collect and divert granular solid material to a discharge port extending across said shell below said compartments defining an upper contacting chamber thereabove and a lower contacting chamber therebelow, a discharge tube extending from said discharge port in a generally downward direction to a point exterior of said shell, discharge means to withdraw granular solids from the bottom of said shell, means to transfer granular solid material downwardly from said upper compartment to a level in said shell intermediate said compartments and said baffle means, means to transfer granular solid material downwardly from said lower compartment to a level intermediate said baffle means and said discharge means, inlet means to admit fluid to the lower portion of said lower chamber, gas transfer means associated with said baffle means adapted to permit upward flow of vapors from said lower chamber to said upper chamber and to prevent entry of granular solids to said lower chamber from said upper chamber, gas outlet means in the upper part of said upper chamber, means to control flow of granular solids through said discharge tube and means to control flow of granular solids through said discharge means, a cooler, means to transfer granular solids from said discharge tube to said cooler, means to pass air through a moving bed of granular solids in said cooler, means to transfer cooled granular solids from said cooler to said upper compartment, a heater, means to transfer granular solids from said discharge means to said heater, means to pass air from said cooler to said heater, means to mix fuel with air so passed to said heater, discharge means adapted to withdraw products of combustion from said heater, and means to transfer heated granular solids from said heater to said lower compartment.

JOHN A. CROWLEY, JR.

REFERENCES CITED

The following references are of record in the file of this patent:

UNITED STATES PATENTS

| Number | Name | Date |
|---|---|---|
| 2,376,191 | Roetheli et al. | Mar. 15, 1945 |

Certificate of Correction

April 5, 1949.

Patent No. 2,466,005.

JOHN A. CROWLEY, JR.

It is hereby certified that errors appear in the printed specification of the above numbered patent requiring correction as follows:

Column 4, line 38, before the word "second" insert *said*; line 45, for "therethrough" read *therethrough*; column 6, line 43, strike out "a" before "discharge"; and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*